United States Patent [19]

Ragle

[11] Patent Number: 4,485,674
[45] Date of Patent: * Dec. 4, 1984

[54] ELECTROMECHANICAL MEANS FOR DETERMINING SIGNATURE FOR REELED WEB

[75] Inventor: Herbert U. Ragle, Thousand Oaks, Calif.

[73] Assignee: Burroughs Corporation, Detroit, Mich.

[ * ] Notice: The portion of the term of this patent subsequent to Jul. 6, 1999 has been disclaimed.

[21] Appl. No.: 342,242

[22] Filed: Jan. 25, 1982

Related U.S. Application Data

[63] Continuation of Ser. No. 053,304, Jun. 29 1979, Pat. No. 4,337,659.

[51] Int. Cl.³ .............................. G11B 5/00; G11B 5/74
[52] U.S. Cl. .................................. 73/432 R; 364/900; 382/1
[58] Field of Search ............ 364/550, 551; 73/432 R, 73/490, 825.3; 382/1; 360/60, 132, 134, 137; 242/1, 57; 235/435, 433, 444, 448

[56] References Cited

U.S. PATENT DOCUMENTS 4,337,659 7/1982 Ragle ............................ 73/432 R

OTHER PUBLICATIONS

Ennes, Harold E., *Television Broadcasting Tape Recording Systems*, Howard W. Sams and Co., Indianapolis, IN, 1979, p. 70.

*Primary Examiner*—John C. Martin
*Assistant Examiner*—Erin A. McDowell
*Attorney, Agent, or Firm*—John J. McCormack; Nathan Cass; Kevin R. Peterson

[57] ABSTRACT

One embodiment discloses a method and apparatus whereby each time a tape is wound upon a prescribed reel, the winding pattern may be assumed to leave the array of tape edges in a unique "edge profile" represented by the position of each winding edge as viewed from one side of the reel along a radial direction—this "profile" being interpreted as a "winding signature"; the signature may be detected and recorded in a convenient encoded fashion for possible use in uniquely identifying and documenting each unspooling/rewind sequence to thereby monitor tape use.

19 Claims, 8 Drawing Figures

ELECTROMECHANICAL MEANS FOR DETERMINING SIGNATURE FOR REELED WEB

This application is a continuation of my copending application U.S. Ser. No. 053,304 filed June 29, 1979 for "Determining Signature for Reeled-Web; Detection and Interpretation Thereof", now issued as U.S. Pat. No. 4,337,659, priority rights being claimed therein in this case.

BACKGROUND, FEATURES OF INVENTION

This invention relates to means for enhancing the security of tape files; and more particularly to methods and associated apparatus for detecting whether a given reel of tape has been unspooled and rewound.

Workers in the art of making and using spooled webs, such as magnetic tape, are, at times, very concerned about security—e.g., about knowing whether or not a given tape segment has been used during a certain time period. Such problems are extreme in the magnetic tape art where it is becoming extremely important to be able to detect the use of sensitive tape files. Such files may contain very valuable highly sensitive data (e.g., a "scrambler code" used for transmitting secret, proprietary data over a relatively non-secure transmission medium).

Thus, many workers in the related arts would be intensely interested in being able to detect whether or not a given reel of tape has been "used"; that is, whether the reel has been mounted on a tape drive and the tape unspooled and operated-upon (e.g., read magnetically and/or written-upon, etc.) during a given reference period—e.g., since the reel was last checked by a security officer.

It is also well known that personnel having legitimate access to such tape files may, at times, be severly tempted to abuse their power and use tapes illegitimately and in secret—e.g., surreptitiously withdrawing a reel of tape and mounting it on a tape drive to run it past a read-head so as to make a copy-tape of sensitive data thereon.

The subject invention provides a solution, at least in part, to this problem and a possible deterrent to such illegitimate use of tape files—doing so by teaching formulation of a "reeled-web signature" which can indicate whether a given reel of tape has ever been unspooled and respooled. It goes without saying that workers in the art will find such an invention of tremendous value and help.

I have noticed that a typical length of magnetic tape such as mylar tape segment t shown in FIG. 2 as wound upon an associated tape reel R-1 winds upon its reel or spool in a certain "random spooled" fashion, tape t may be understood as conventional, comprising a magnetic recording web about one-half inch wide by about 1-5 mils thick and having magnetic material recorded on one or both sides of its mylar (or like) substrate. The tape is typically wrapped upon itself several thousand times about the hub of a reel R-1 as is well known in the art. I have observed that each time such a length of tape is unwound and then rewound upon a storage spool, the successive turns, or "reeled layers" of tape virtually never sit in registry exactly atop one another—rather they assume a "stacking profile" that is characteristically "random" as is quite schematically indicated in FIGS. 3 and 4.

Such an unspooling and rewinding would typically take place in the course of mounting the reel of tape (e.g., supply reel R-2 in FIG. 1) in operative position on an associated tape drive apparatus TD as well known in the art and threading the tape t through a read head apparatus R, and intermediate tape guide means, to terminate on a take-up reel R-1. Thus, as the tape is unspooled from supply reel R-2 and drawn past the read head RH and the intermediate guides, it will be understood as taken-up by take-up reel R-1 in a prescribed well known fashion.

While I cannot be sure, I believe that the cause(s) of this "random" stacking profile derive, in part, from such things as the random infiltration of ambient air between tape turns during wind-up, from shifting tension forces on the tape during spooling and unspooling and/or from a shift in winding tension.

Thus, I have formulated a technique for detecting whether a given reel of tape has been unspooled and rewound—even partially—this technique involving a determination of the reeled-tape "signature" after any, or all, winding sequence, as more particularly described below.

I have, further, devised an improved tape reel wherein a "reference locus" may be automatically provided in a tape reel for comparison with the wrapping profile of the tape.

Moreover, the subject invention also teaches techniques and apparatus for automatically detecting such a wrapping profile or "signature" for any (every) tape-wrapping sequence. That is, each time a segment of tape is wrapped upon a spool, the wrapping profile may be automatically detected and identified uniquely (and preferably encoded) so that each such tape-wrapping sequence can provide a unique "finger-print" of itself—this preferably being done automatically or semi-automatically.

If such a "signature" be recorded it may be used as a means of indicating any and all uses of the tape which involve any spooling of tape segment. For instance, a "wind-up log" may be kept for each reel, and dated, so that unauthorized "unspooling and associated use" can be automatically detected and attended-to—e.g., by a "spot check" of the wind-up log for that reel. Such a practice can obviously be used as a powerful deterrent to any would-be malfactors also.

Thus, it is an object of the subject invention to provide at least some of the foregoing solutions and features of advantage. Another object is to provide a method and means of determining whether a segment of tape has been unspooled and rewound. A related object is to provide a wrapping profile or "signature" of a "reeled web".

A further object is to provide a determination of the wrapping profile for a spooled tape. Yet a further object is to detect such a wrapping profile, or signature, of a spooled tape segment in a prescribed encoded form, convenient for use in improving security against illegitimate tape usage, etc. A further object is to provide related techniques and apparatus to detect such a signature of reeled web segments. A further object is to provide improved techniques and associated apparatus for spooling tape segments on a prescribed reel. A further related object is to provide prescribed reference loci on such a tape reel for better determining such a "signature".

BRIEF DESCRIPTION OF THE DRAWINGS

These and other features and advantages of the present invention will be appreciated by workers as they become better understood by reference to the following detailed description of present preferred embodiments; these being considered in conjunction with the accompanying drawings, wherein like reference symbols denote like elements:

FIG. 2 is a somewhat schematized top view of a typical magnetic tape reel with a segment of tape wrapped thereon in the usual manner and including a signature-detector according to one embodiment; while, FIG. 2A is an isometric elevation of a small arcuate section of this reel; and, FIG. 3 is a side elevation of this section, with the edges of the tape wound on the reel being emphasized for clarity and viewed in profile from the side, and enlarged; while, FIG. 4 depicts a representative subsection of the section in FIG. 3, being shown in greatly enlarged idealized fashion in conjunction with;

FIG. 4 a related "profile scale" indicating relative position of tape windings.

PREFERRED EMBODIMENT; DETERMINTATION OF TYPICAL "SIGNATURE" FOR REELED-WEB; FIGS. 1-4

As suggested before, FIGS. 2-4 are a schematized, rather idealistic representation of a typical segment of tape t wrapped upon a conventional spool or reel R-1 (tape t, as described above). Thus, FIG. 2 will be understood as a somewhat simplified upper isometric of a tape reel R-1 on which segment t of magnetic recording tape will be assumed as conventionally wound. Hence, and elsewhere in this disclosure, it may be assumed that the methods, materials, structure and related techniques are conventional as practiced in the art today, except as otherwise specified.

Figure 1:
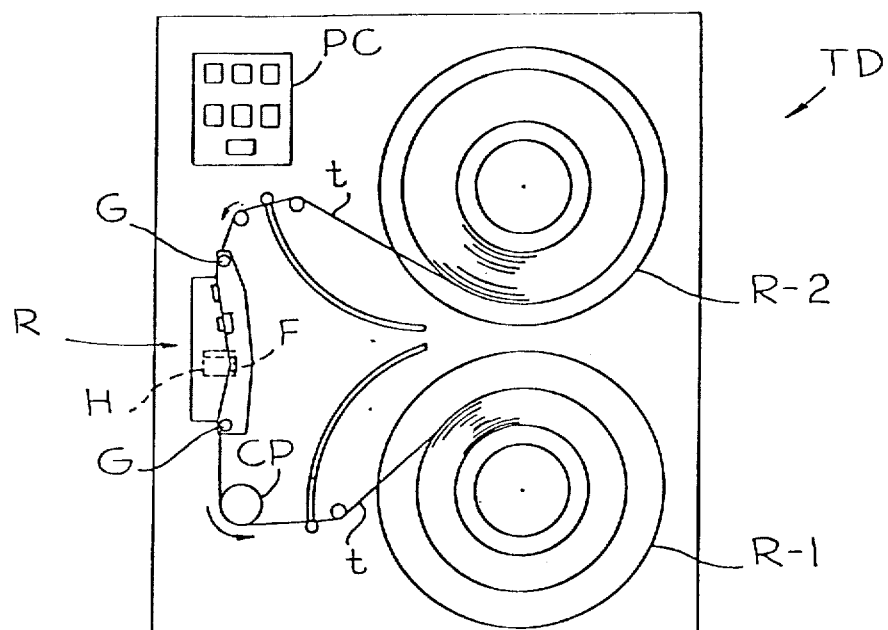
FIG. 1 is a very schematic idealized frontal showing of salient elements of a prior art tape drive.
Figures 2, 2A:
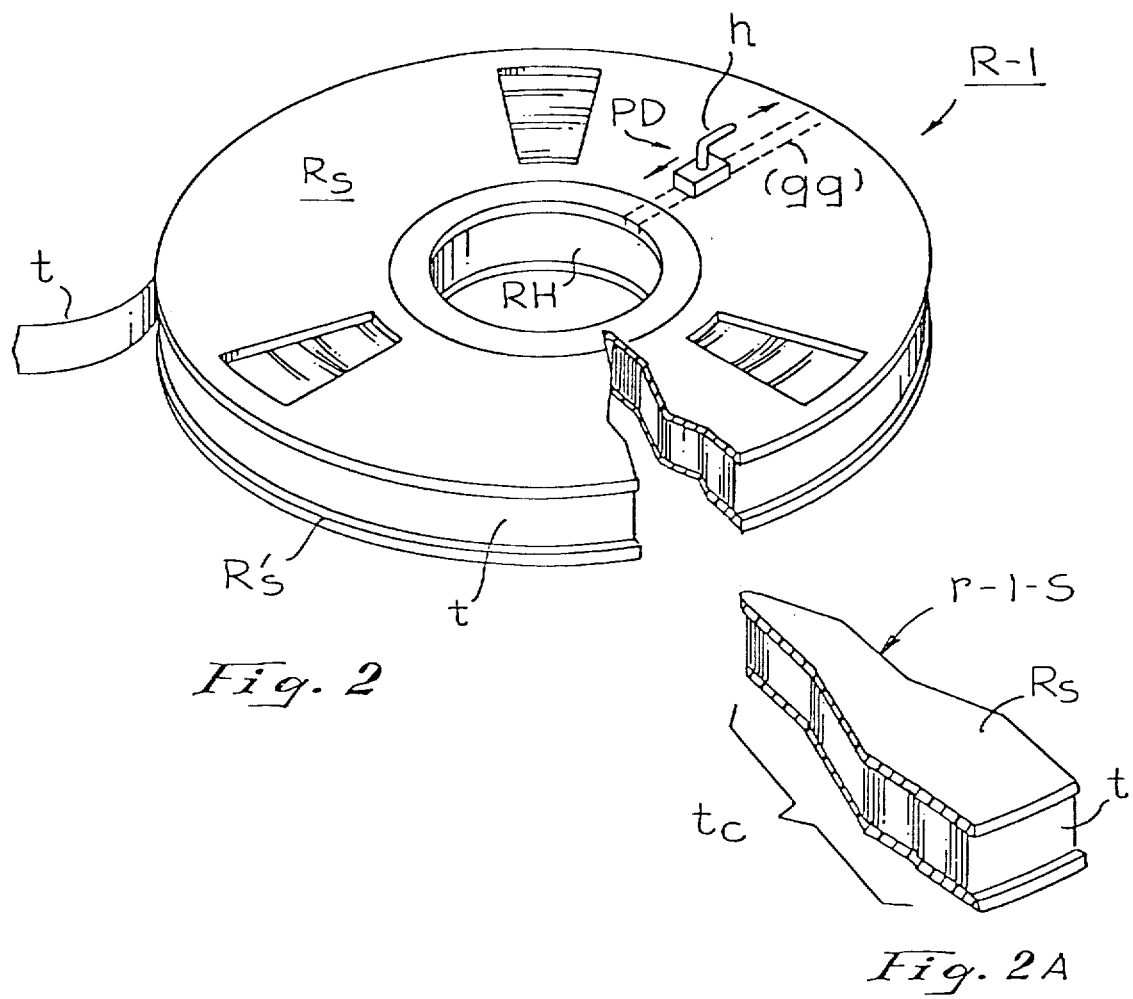
Figure 3:
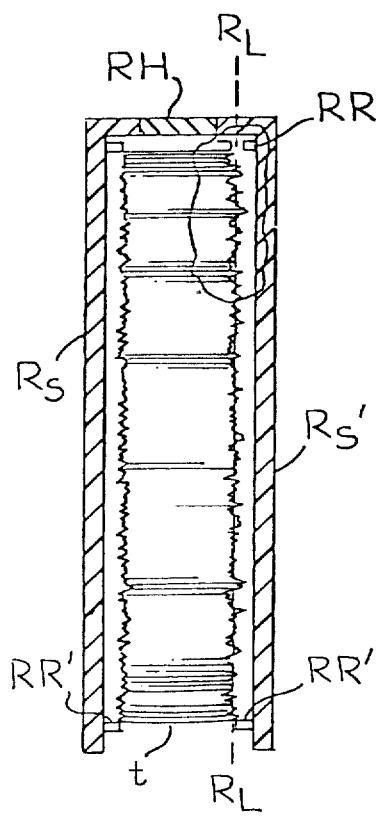

The "slice-of-pie" sectorial section from reel R-1 in FIG. 2A will be understood as exploded-away; and as shown rotated 90° in FIG. 3, representing a cross-section of the tape as wound in a given wrapping configuration upon the hub of reel R-1. The overlapping layers of tape t (see section at t2-C, FIG. 2A) will be understood as wound in conventional randomly-superposed fashion upon the outer cylindrical periphery of reel hub RH, the tape spool lying between the sides $R_s$, $R'_s$ of reel R-1 as is well known in the art.

As an improvement feature of invention (described below), reel R-1 has been indicated as provided with two pairs of reference stubs, or projections, RR, RR', one pair RR projecting inwardly from the top and bottom sides $R_s$, $R'_s$ adjacent the reel hub; and the other pair (RR') adjacent the outer periphery of the sides. The distal faces of such stubs are intended to establish a "reference locus", i.e., plane $R_L$—$R_L$ convenient for use in referencing the position of the superposed so-wound tape edges as described below.

Figure 4:
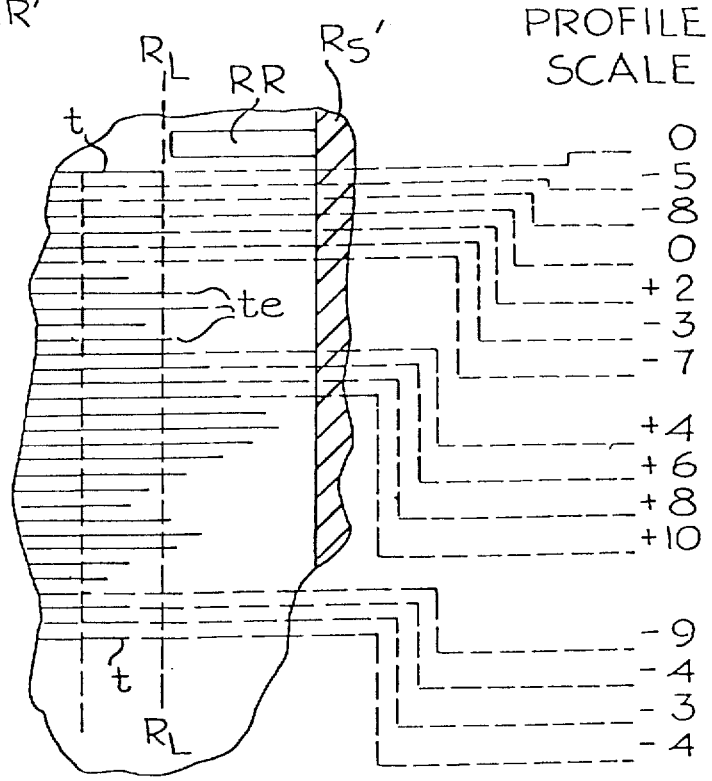

FIG. 4 is a greatly-enlarged view of a portion of such an edge profile from FIG. 3, with each tape edge being given a representative scaler "position-value" relative to such a reference plane $R_L$—$R_L$ in the scale of FIG. 4. That is, exemplary layers of tape are given arbitrary scale values in FIG. 4 (adjacent to the illustrative tape segment in FIG. 4) according to the sense (left/right: +, —) and the degree of variance of each respective tape-edge from reference plane $R_L$—$R_L$.

Now, according to the invention, such an indicated wrapping pattern may be understood as ordinarily "unique" for each unspooling and rewrapping sequence with the tape segments and their ends falling in different respective positions from those of a prior unspooling-/rewind sequence. Such a spooling sequence or wrapping signature may, according to the invention be determined and may be detected; also, where appropriate, it may be recorded in some appropriate fashion as workers in the art can readily visualize.

Thus, in FIGS. 3 and 4 successive wrapping layers of tape t on the hub of reel R-1 may be understood as disposed in a conventional "randomly stacked" fashion wherein a profile along either edge of the superposed tape segments may be thought of as a stacking "fingerprint", or "signature", uniquely identifying the manner in which the tape is so-wrapped on reel R-1. Thus, if the referenced stacking plane $R_L$—$R_l$ is thought of in terms of a "normal" position along which the edges of the tape segments will fall when they are perfectly unskewed and wrapped to lie in registered superposed fashion,—then one may arbitrarily assign values to the "deviations" suffered by each layer (loop) of tape, according to the extent it varies from such normal superposed registry.

As an example the "profile scale" in FIG. 4 is intended as an exemplary indication of the relative position of each tape edge te—with selected edges given a scaler value along the assigned positional scale, e.g., relative to the reference plane $R_L$—$R_L$ between the distal faces of stubs RR, RR' as indicated above. Thus, for instance, the distal face of stub RR has been given a scale value of zero (0) and the tape edges adjacent thereto have been given values successively of: —5, —4, 0, +2, —3, —7 (with the "minus" values being understood as applying to edges falling to one side of the reference plane $R_L$—$R_L$; and the "plus" values applying to edges falling to the other side of $R_L$—$R_L$). Other values are similarly indicated by way of example, in this profile scale, as associated with the relative position of other representative tape edges.

Thus, workers in the art can readily visualize that, using the above described concept of a wrapping "signature" according to the invention, detection means may be devised (such as a feeler gage type instrument in FIGS. 6-8, described below) which may automatically detect the position of each successive tape loop edge (e.g., relative to a reference plane such as $R_L$—$R_L$) and so identify all edge positions. The entire array of edge-positions may be thus, identified as a prescribed winding-pattern—e.g., in a scalar code of the type suggested in FIG. 4. In this way, detect/encode/indicator means may automatically provide an indication of the "signature", or overall wrapping profile, of the entire spool of tape (for a given winding sequence).

Workers will be quick to appreciate the usefulness of such a "wrapping signature" concept and will contemplate various ways that it may be detected and identified and/or recorded. They will also contemplate various related techniques for using such a recorded "signature". As one example, with such an arrangement according to the invention, a given set of tapes (tape library) in a certain high-security installation containing secret data may be protected by providing "signature-indication" for each reel, every time tape is wound thereon. Then, any unauthorized use of any tape (involving an unspooling/rewind operation of necessity) may be detected—e.g., in the following manner:

Security PLAN AA

The authorities will provide means, as here taught, for automatically detecting the tape wrapping "signature" such as those indicated below relative to FIGS. 6–8. They may require that, after each spooling (rewinding) of tape on any reel, the "wrapping signature" be detected and recorded (preferably automatically or semi-automatically as described below) and provide for any selected encoded representation thereof. Such an encoded "signature" may, for instance, be automatically recorded as data on one, or several, portions of the tape itself (and these locations and code may be kept secret from the ordinary operators if such is desired). They may also require that an encoded representation of the "signature" be automatically printed out and imprinted, in human-readable form, somewhere on (a label) each reel. They may also require that this be recorded elsewhere, such as on a master file remote from the computer installation and relatively immune from tampering by operating personnel.

Moreover, the code itself may of course, be selected of any arbitrary form—and the code may be changed at will in both space and time. Thus, for instance, a first signature code may be recorded on one or several portions of the tape segment itself; while it may be encoded in a different form to be imprinted upon the tape reel and re-encoded in yet a third form for safekeeping at a remote installation. Further, the encoding process may be rendered relatively simple, automatic, inexpensive and convenient as workers in the art well know. Such a code may be controlled by one, or a very select few, of the security personnel and be changed from time to time at their pleasure.

Workers in the art will readily appreciate that such a system of automatic signature detection and encoded recording can be used in several ways to discourage, if not completely eliminate, unauthorized use of tape files. Each unspooling/spooling operation will generate its own unique signature (remote from the computer room and inaccessible to the operators there) which uniquely indicates each and every spooling operation. A "spot check" of recorded signatures from time-to-time and unannounced can help greatly to tighten security at such a computer installation. During such a spot check the recorded wrapping "signature" can be compared with the actual wrapping profile on any tape reel (e.g., to detect whether or not the signature recordation system is operative each time an actual spooling occurs—and this may be combined with an unspooling-/rewinding exercise). Also, the "signature" indicated at the mentioned remote installation may then be compared with the actual condition of selected tape reels—e.g., the monitor agent can, with a separate "feeler gage" or the like, generate his own signature read-out to see if the actual wrapping profile of selected reels corresponds with that recorded for them.

Moreover, it will be readily apparent that the very existance of such a security system, once properly publicized to the operators at such a computer installation, should have a very strong deterrent effect—they can never be sure when a check will run, and it may reveal that a tape file has illegitimately unspooled and rewound under their jurisdiction. Workers will readily appreciate how valuable such a security system can be and yet how surprisingly simple it is to formulate and implement. As an added fillip, it is even possible to arrange and operate the signature detection instrumentation so as to baffle the tape operators themselves—that is, they may be allowed to witness an incredibly accurate demonstration of signature-detection, yet without being told, or being able to perceive how this is accomplished. (They may be unable to deduce that spooled edge alignment is being detected even though they are the ones operating the signature detection equipment). Obviously, a system which has a degree of mystery and yet "uncanny accuracy" can afford added cautionary value to a security system.

Thus, workers will appreciate that this invention involves novel techniques for formulating "tape signatures" (e.g., by developing signature data representing the edge-wrapping pattern of a tape coil) and using them (e.g., by comparing such signature data from time to time).

Exemplary signature detection; FIGS. 6–8

Figure 6:
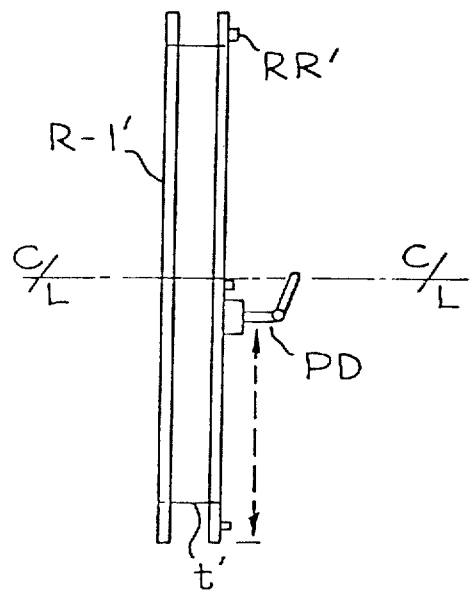
FIG. 6 is an end view of a tape reel RR' generally similar to that in FIGS. 2-4, and emphasizing apparatus, according to the invention, for automatically detecting the wrapping profile of the tape on the reel, with salient functional elements of this detection apparatus embodiment being indicated in FIG. 7 in operative relation with portions of the reel, this being indicated very schematically in FIG. 8 in operative relation with a representative, greatly enlarged, subsection of the so-spooled tape, the tape being depicted in the fashion of FIG. 4.
Figure 7:
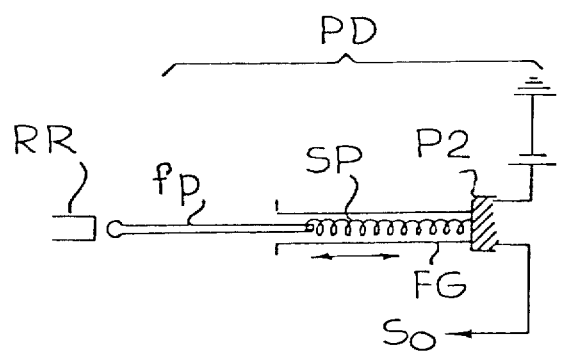
Figure 8:
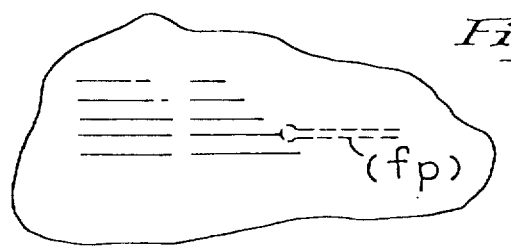

FIGS. 6–8 indicate representative means for detecting a tape wrapping "signature" as above described and contemplated, although workers will realize that other detection arrangements and techniques may certainly be used. It will be evident (relative to this and other signature detection arrangements) that it is quite simple, convenient and inexpensive to implement signature detection accordig to this invention. Here, and elsewhere, it will be understood that the methods, apparatus materials, etc., will be understood as conventional as presently known in the art except as otherwise specified.

FIG. 6 will be understood as an idealized end-view of a tape reel R-1'. A length of tape t' will be understood as wrapped in the conventional manner on reel R-1' (the tape, reel, etc., of FIGS. 6–8 are to be understood as the same as described for FIGS. 1–4 except as otherwise specified). FIG. 6 may be understood in connection with FIG. 2 wherein a profile detector means PD, including a manual handle h, is provided, being adapted to be manually drawn along a groove gg cut through a side RS' of the reel. Thus when such a detector PD is drawn radially across the reel, the individual positions of each successive tape loop or wrapping will be understood as automatically detected and indicated—e.g., in a prescribed selectable code.

More particularly, the functional elements of detector PD are indicated in FIG. 7 as comprising a mechanical detent or feeler pin, fp mounted to be reciprocated linearly along a given guideway FG, being urged outwardly therealong by a coil spring sp which is based and operatively disposed upon the detecting surface of a piezoelectrical crystal P2. Crystal P2 may be conventionally connected between a source of current and an output terminal $s_o$ so that, as pin fp is moved toward and away from the detecting surface of P2, the pin will cause intermediate bias spring sp to apply greater or lesser pressure to this detecting surface. This pressure differential will be understood as conventionally indicated at output $s_o$; for instance, by an increase or decrease in read-out voltage as well known in the art. Pin fp will be understood as drawn (here, manually, although the drive may be made automatic as workers will readily appreciate) along groove gg and arranged to so-engage the edge of each successive wrapped loop of the tape on the reel R-1' as to be shifted in its position toward and away from detector P2 as indicated somewhat schematically in FIG. 8. That is, as the unit PD is drawn, scanningly, across the stacked tape edges, pin fp will be understood as driven, back or forth, against the urging of spring sp, to exert greater or lesser pressure against transducer P2—the voltage level output thereof being used to represent the position of each successive layer as known in the art.

In this manner, as workers will appreciate, an automatic read-out $s_o$ may be derived to indicate the wrapping profile. This read-out can be denominated as the "wrapping fingerprint" or "signature" of this particular tape when so-wound upon this reel. Of course, for each successive wrapping, a different set of fingerprint will presumably be generated. Moreover, this output may, of course, be readily encoded by means well known in the art, e.g., to indicate a profile scale in the manner of the numerical scale indicated in FIG. 5 and described above.

Modify reel with "reference surfaces"

As a preferred embellishment, and to provide a reference fingerprint signal and a reference position for the tape edges, the pair of like annular reference rims RR, RR' are provided about the (inner and outer) circumferences of the reel sides and on the inner surfaces thereof, as indicated above relative to FIGS. 3 and 4. The distal faces of these rims are arranged and positioned to protrude from sides $R_s$, $R_s$, sufficient to define a reference plane $R_L$—$R_L$; this plane intersecting the normal non-skewed position of the wrapped tape edges as for FIG. 4. In this fashion a referenced read-out can be provided at the beginning, and at the end, of each sweep of instrument PD across the reel radius—the faces of rims RR, RR' serving as reference surfaces. Pin fp is arranged to brush across these reference surfaces at the beginning and end of its radial sweep and so provide a "zero reading". In some cases, the detector PD will be arranged to scan either or both sides of such a reel—and in such a case, such rims RR, RR' will be provided on both reel sides (as illustrated).

Modifications, alternate embodiments

Workers will contemplate alternate detecting means and other ways of using such "signatures" as well as other ways of encoding the "signature".

Conclusion

It will be understood that the preferred embodiments described herein are only exemplary, and that the invention is capable of many modifications and variations in construction, arrangement and use without departing from the spirit of the concepts taught. As an example, the means and methods disclosed herein are also applicable for certain other uses as workers will contemplate.

All variations of the invention being merely illustrative, the invention should be considered as including all possible modifications and variations coming within the scope of the invention as defined by the appended claims.

What is claimed is:

1. A method of developing a wrapping profile, or winding signature, for a tape web segment adapted to be wrapped upon a prescribed reel, this method being adapted to enhance computer tape file security so that each time such a web is wound upon a reel, the winding mode, after repeated windings, is assumed to leave the array of wrapped web edges in a unique edge wrap profile represented by the position of each winding edge as sighted radially along one side of the reel, such a profile constituting the winding signature, this method involving:

providing monitor means for automatically monitoring the relative positions of these web-edges and so detecting this "winding-signature", and also for representing and storing these position values as a prescribed encoded signature representation each time the web is wound; this means being adapted to automatically make such "signature" representations available for use in monitoring unspooling and respooling operations.

2. The method as recited in claim 1, wherein said representations are arranged to be used by arranging for the automatic recordation of such edge positions as encoded signature representations each time a web is so wound; and also providing means to compare such a recordation with a previously determined wrapping profile of a subject reel.

3. The method as recited in claim 1, wherein such signature representations are generated by providing a winding reel with mechanical reference surface means and with edge position detect means; said reference surface means being arranged to establish a reference locus along which the tape edges will normally lie; and by scanning said detect means across said reference surface means and across the edge of the so-reeled web whereby to provide a position-value output, indicating the variance of tape web winding edges from said reference locus.

4. The method as recited in claim 3, wherein said detect means are provided as mechanical feeler means mounted in a carrier adapted to be reciprocated linearly along the reel radius and operating to detect the position of said edges.

5. A method of ascertaining whether a given reel of tape has been unspooled and respooled as a means of enhancing tape file security, the method comprising:

providing means for automatically detecting the wrapping profile of the tape edges in the form of a prescribed "wrapping signature", this "signature" comprising representations of the relative position of said tape edges and, also providing associated compare means for comparing this signature with a known "standard".

6. The method as recited in claim 5, involving establishing a mechanical reference plane using reference surfaces associated with the tape reel; scanning the wrapped web and detecting the position of successive loop edges relative to said reference plane; and assigning values to the deviations of each loop edge relative to said reference plane.

7. The method as recited in claim 5, wherein such a wrapping profile is automatically detected for each and every tape-spooling sequence by detecting loop-edge position and encoding the successive position readings with the "standard" to generate a unique "fingerprint" characteristic of each wrapping operation, this standard devised as representations of prior reference positions of the edges.

8. Apparatus for developing a "stacking fingerprint", or wrap signature, to uniquely identify each tape wrapping operation automatically and on associated tape reel means, this apparatus comprising:

position detect means adapted to be mounted on one side of said tape reel and to be scanned radially across the so-wrapped tape to automatically detect and indicate the position of each wrapped edge and responsively generate an output indication thereof; and output means adapted to receive and process said indication.

9. The combination as recited in claim 8, as combined with code generating means adapted to automatically convert said indication to a "wrapping code" representation.

10. The combination as recited in claim 9, as combined with means for receiving and automatically storing the wrapping code representation each time a tape is spooled, whereby a monitoring sequence is facilitated during which a wrapped tape segment may be rescanned to generate a "present wrapping code" representation for comparison with the so-stored automatic representation of a prior wrapping code, this as a means for checking file security.

11. An improved method of winding recording tape on a prescribed spool means so as to later ascertain whether the tape has been unspooled and respooled, this method comprising:

automatically detecting the wrapping profile of the tape edges, in the form of a prescribed wrapping "signature" each time tape is so spooled; and encoding and storing this "signature" so as to compare it with a known standard.

12. The method as recited in claim 11, including the step of providing a mechanical reference wrapping locus and automatically so determining the position of each wrapped tape edge relative to said locus.

13. The method as recited in claim 12, wherein said tape edge positions are automatically detected and encoded into a chain of edge-position indicia signals and wherein those indicia signals are automatically stored as a representation of the wrapping signature of the tape each time the tape is spooled.

14. The method as recited in claim 13, wherein, each time said tape is spooled, the wrapping signature signals developed, representing the edge-wrapping pattern of the spooled tape, are stored by storage means adapted to facilitate comparison of the so-developed signals with a standard pattern representing a prior or and idealized wrapping.

15. Tape reel storage means including cylindrical reel hub means on which record tape may be spooled, this hub means including a hollow center portion for mounting upon reel rotation means; and a pair of sides mounted on said hub means and adapted to confine and protect the tape as wrapped; at least one of said sides being arranged to include reference edge means adapted to establish a reference-locus against which the wrapped edge position of the tape loops may be compared, this side also being adapted to accommodate a signature detect means and signature detect means operating associatively with said hub means and adapted to scan the coiled edges of said tape to detect the relative positions thereof.

16. The apparatus as recited in claim 15, wherein at least one of said reel sides includes a radial slot adapted to receive said detect means, together with a pair of reference surface stubs projected from said reel sides so that their surfaces define said reference-locus.

17. The apparatus as recited in claim 16, as combined with signature detect means comprising edge locator means adapted to be mounted for reciprocation along said slot and including transducer means adapted to be scanned over the reference surfaces and across each tape loop edge, successively, and to thereby develop an encoded representation of the edge position relative to said reference-locus.

18. The combination as recited in claim 17, wherein encoding means are provided and adapted to develop a chain of position indicia representing variance of each wrapped tape edge from said reference-locus and also adapted to indicate said indicia; and wherein drive means are also provided, being adapted to implement this scanning of said feeler means radially across the spool means.

19. The combination as recited in claim 8, as combined with said tape reel means on which the tape may be so wrapped, this reel means including reference-surface means, and wherein said detect means is disposed and adapted to coact with said reference-surface means to thereby establish a reference-locus for normalizing the position values of tape edges.

* * * * *

UNITED STATES PATENT AND TRADEMARK OFFICE
CERTIFICATE OF CORRECTION

PATENT NO. : 4,485,674

DATED : December 4, 1984

INVENTOR(S) : Herbert U. Ragle

It is certified that error appears in the above-identified patent and that said Letters Patent is hereby corrected as shown below:

Col. 1, line 37, change "severly" to --severely--.
Col. 3, line 52, change "Hence," to --Here,--;
 line 62, change "t2-C," to --t-C,--.
Col. 4, line 35, change "$R_L - R_1$" to --$R_L - R_L$--.
Col. 6, line 11, after "will" insert --be--;
 line 43, change "accordig" to --according--.

Signed and Sealed this

Twenty-third Day of April 1985

[SEAL]

Attest:

DONALD J. QUIGG

Attesting Officer  Acting Commissioner of Patents and Trademarks